Sept. 2, 1969  E. E. LEIBERT  3,464,276
INCLINOMETER OR ACCELEROMETER
Filed June 1, 1965

INVENTOR.
EDWARD E. LEIBERT
BY
Orland M. Christensen
ATTORNEY

United States Patent Office 3,464,276
Patented Sept. 2, 1969

3,464,276
INCLINOMETER OR ACCELEROMETER
Edward E. Leibert, 7803 60th Drive NE.,
Marysville, Wash. 98270
Filed June 1, 1965, Ser. No. 460,430
Int. Cl. G01p 15/08
U.S. Cl. 73—516    8 Claims

ABSTRACT OF THE DISCLOSURE

This invention relates to a simple reliable device for providing an electrical output proportional to either the acceleration, inclination or combinations of both. It does so by means of a novel arrangement of photosensitive elements, fluid and a light source arranged so that a very small change in inclination of the liquid surface creates a large difference in light level seen by the photosensitive elements.

---

This invention relates to devices for indicating inclination or acceleration. More particularly, it relates to such a device which utilizes a novel arrangement of liquid, light source, and light from the source reflected from or refracted through the surface of the liquid onto photosensitive means positioned according to the invention to sense changes in the inclination of the liquid surface. While the invention is herein described in terms of particular embodiments thereof, it will be understood that various changes and modifications may be made therein without departing from the principal features involved.

This invention seeks to improve on devices provided in the past for indicating acceleration or inclination by providing a simple and convenient unit operable to produce indications representative of inclination or acceleration, as the case may be, in one or more vertical planes, and one which is accurate, reliable and easy to maintain as well. The device includes a container partially filled with light-transmitting viscous liquid and a light source positioned in the device to direct light upon the surface of the liquid, preferably from beneath the surface. It further includes photosensitive means positioned to receive a proportion of the total light emitted by the source, including light first incident upon the liquid surface. Further, the photosensitive means is so located in relation to the light source and liquid surface that changes in the relative slope of the surface produce related changes in the proportion of light received by the photosensitve means. An indicator means is connected to be responsive to the photosensitive means to indicate the inclination or acceleration. Of course the output indication can be either read or utilized, for example, to operate a servo system for maintaining a movable object at a given attitude.

Preferably, the photosensitive means includes a pair of photoconductive or photoemissive elements which are disposed on opposite sides of the confined body of liquid, each element having portions above and below the liquid surface, whereby changes in inclination of the surface cause changes in the relative amounts of light received by the respective elements by effecting relative change in reflection and refraction of light at the liquid surface. The indicator means preferably includes a bridge circuit having the photoelements in adjacent arms thereof and responsive to changes in the relative light intensity on said elements.

In the preferred embodiment the device include a four-sided container having a light-sensitive element on each side, and the liquid surface divides each element approximately in half in the absence of inclination or acceleration. The bottom of the container includes a window, and the light source comprises a lamp affixed to the container adjacent and below the window and positioned so that the container bottom acts as a light shield, the window periphery casting a shadow on all four photosensitive elements along the liquid surface line. Thus, light is received by the upper portions of the elements by refraction at the surface and by the lower portions by reflection from the suface. The photoelements in this four-sided embodiment are connected in opposite pairs to measure inclination in two mutually perpendicular planes, and this arrangement can be adapted to permit computation of components of inclination or acceleration in any vertical plane.

These and other features, objects and advantages of the invention will become apparent from the following more detailed description, taken in connection with the accompanying drawings.

Figure 1:
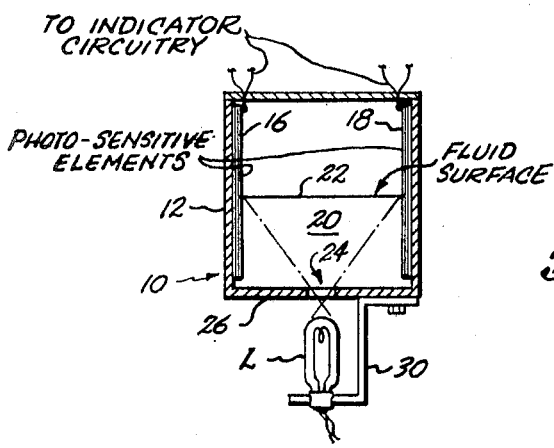
FIGURE 1 is a sectional side view of a device having the basic features of the invention.

In FIGURE 1 the four-sided container 10 shown in cross section includes photosensitive elements 16 and 18 attached to its opposite sides 12 and 14 and extending nearly the full length vertically thereof. A viscous fluid 20, such as silicon oil or other liquid of suitable viscosity, half fills the container, its surface line 22 approximately dividing the photosensitive elements 16 and 18 into equal upper and lower portions. A window 24 formed in the bottom 26 of the container consists of glass or any suitable plastic material bonded within an opening cut or cast in the bottom.

The lamp L energizable by a power source not shown is carried below the window on a bracket 30 attached rigidly to the container 10 and is so disposed that the periphery of the window 24 forms a shadow line coinciding on the photoelements with the surface line 22 thereon as shown. Hence, the light from the lamp L is first incident upon the surface 22, from beneath, and reaches photoelements 16 or 18 only indirectly, in that the light rays are refracted toward the upper portions of the photoelements and are reflected toward the lower portions. The relative proportions of emitted light reflected and refracted change with inclination or acceleration.

Figure 2:
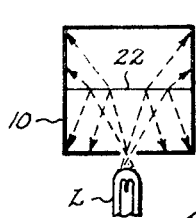
FIGURES 2, 3 and 4 are somewhat diagrammatic sectional side views indicating by dotted lines the paths of light rays reflected from and refracted at the liquid surface, showing approximate angles of refraction and reflection in the absence of inclination in FIGURE 2, and with progressively increasing degrees of inclination in FIGURES 3 and 4.
Figure 3:
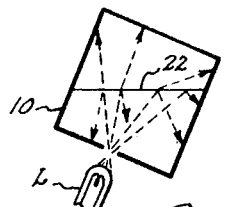
Figure 4:
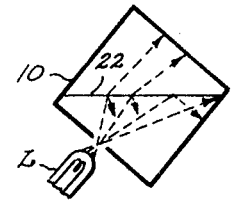

This is best illustrated in FIGURES 2, 3 and 4 wherein the paths of representative light rays are shown by dotted lines. In FIGURE 2, representing the absence of inclination or acceleration, the light rays are arranged substantially symmetricaly within the container. A portion of the projected light is refracted in passing through the surface of the liquid, which has a higher index of refraction than the air above it. The remainder is reflected at the surface, either toward the photoelements (not shown in FIGURES 2, 3 and 4), or toward the bottom, which is preferably blackened so as not to reflect light and cause spurious effects.

In FIGURE 3 the container 10 and light source L are shown slightly tilted, causing a relative inclination of the surface 22 with respect to the photoelements. The light rays, consequently, are refracted and reflected in a manner substantially as shown, causing an imbalance in the proportions of the total emitted light reaching the respective photoelements. While some light still reaches the photoelement on the left-hand side, the right-hand element receives a greater proportion of the total emitted light, and receives more of it by reflection than by refraction.

In FIGURE 4, representing nearly a 45-degree tilt, a still greater imbalance exists in that little of the light transmitted through the window reaches the photoelement on the lefthand side, while a still greater amount is reflected to the right-hand photoelement.

It will be observed from this series of figures that not only does an imbalance occur in the light received by the respective photoelements, but the proportion of total emitted light which is received by the "down-hill" element, for example, increases with the degree of inclination, reaching a maximum at approximately forty-five degrees. The absolute intensity on the right-hand element at this angle, received entirely by reflection, is greater than the total amount received by reflection and refraction at zero inclination. This demonstrates that only one photoelement is basically necessary for operation of the device, although the novel arrangement of one or more pairs of photoelements greatly increases accuracy and provides other advantages as well, as discussed hereinafter.

Figure 5:
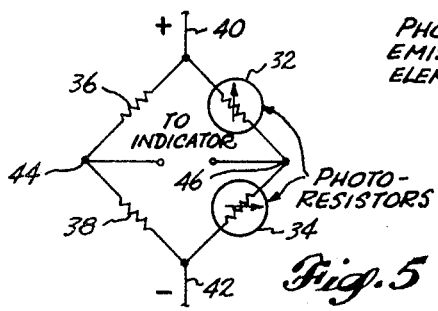
FIGURES 5 and 6 show different connections of indicator circuitry including the photosensitive elements, depending upon the type of elements employed.

As stated earlier, the invention is adapted for use of photosensitive elements of either the conductive (photoresistor) type or the photoemissive type, and the indicator circuit employed will be arranged accordingly. When photoresistors are employed, the indicator circuit shown in FIGURE 5 is preferred, comprising a bridge circuit having the photoresistors 32 and 34 connected in adjacent arms thereof and having resistors 36 and 38 connected in the other pair of adjacent arms. One or both of the latter may be made variable to provide for adjustment of the circuit. Bridge terminals 40 and 42 are connected to positive and negative leads, respectively, of a suitable supply voltage, and the opposite bridge terminals 44 and 46 are connected to a suitable indicating instrument, such as an ammeter (not shown).

A typical construction of the device found suitable includes photoelectric cells comprising one-inch by one-half inch ceramic plates or cards with silicon or other photosensitive material printed directly thereon. Photocells of the sigma type—No. 42L500, have also been found suitable. A 7½ volt potential is applied to the bridge, and a milliammeter with 2500 ohms connected in series is used as the indicator. The dimensions of the container and photocells and the viscosity of the liquid used are such that one gravity of acceleration causes approximately 45 degrees of inclination, which is equivalent to the situation illustrated in FIGURE 4. The bridge circuit arrangement eliminates temperature sensitivity. Such a construction has been found to give highly linear readings over a ninety-degree inclination range.

Figure 6:
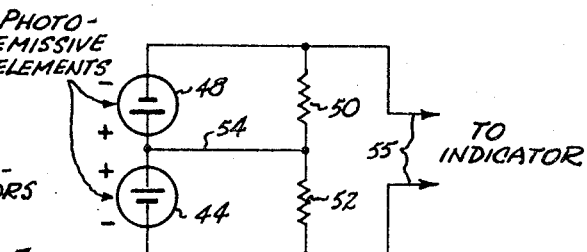

The alternative arrangement shown in FIGURE 6 is used when emissive type photoelements 48 and 49 are used. These elements are connected in opposing polarity in adjacent arms of the bridge circuit with resistors 50 and 52 connected in the other pair of adjacent arms. The two neutral points of the bridge circuit are connected by a short circuit lead 54, and output terminals 55 are connected to a suitable indicator not shown, which is thereby made responsive to an imbalance in the amounts of current generated by elements 48 and 49 causing a voltage imbalance in the circuit.

Figure 7:
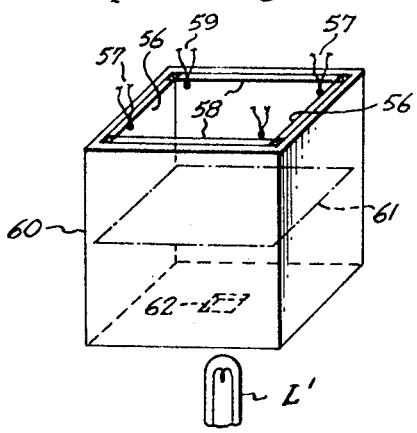
FIGURE 7 is an isometric view of a second preferred form of the invention including two sets of photosensitive elements within a four-sided liquid container. The top is omitted to reveal internal details, while other details are shown by broken lines.

In the preferred embodiment shown in FIGURE 7 two pairs of photoelements 56, 58 are bonded to the inside surfaces of two pairs of the four sides of a substantially cube-shaped container 60. Connection of opposing pairs of these elements in separate bridge circuits (not shown) by means of terminals 57 and 59, respectively, permits inclination readings in two mutually perpendicular planes. Suitable combining circuitry can then be employed to determine components of inclination in any vertical plane or acceleration in any direction. For example, this arrangement can be used in combination with servomechanisms capable of maintaining a movable platform level.

The container 60 is shown with the top omitted to reveal internal details, but a completely enclosed container is, of course, necessary to maintain the liquid in the container in the event of inversion thereof, as well as to maintain the device dust free and to exclude ambient light. The liquid surface 61 shown by a dot-dash line is again located approximately halfway between the top and the bottom of container 60, and lap L' is positioned with respect to window 62 so that the periphery of the window creates a shadow line on the photoelements 58 substantially coinciding with the surface line 61 in the absence of inclination or acceleration.

It will be recognized that a container having any number of walls and any desired number of photoelements can be used. For example, a container having three vertical walls and associated photoelements could be employed in combination with an output circuit capable of combining the outputs of the photoelements and operable to compute the angle of inclination in any desired planes. It will be recognized further that the photoelectric cells can be located external to the container, or may themselves comprise the walls of the container.

The invention provides an extremely simple inclinometer or accelerometer capable of achieving a very nearly linear response at virtually any desired voltage level, and is capable of good repeatability of measurements for a wide range of sensitivity requirements. Other advantages and modifications within the spirit of the invention will be recognized by those skilled in the art.

I claim as my invention:

1. A device for measuring acceleration or inclination, comprising a structure including a container partially filled with light-transmitting liquid, a light source positioned in the structure below the surface of the liquid to direct light upon the surface of the liquid, a photosensitive element positioned with its sensitive surface partially below the surface of the liquid and partially above to receive a portion of the total emitted light, including light first incident upon said surface, and so located in relation to the light source that changes in the relative slope of the liquid surface produce related changes in the portion of light received by the photosensitive element, and indicator means connected to be responsive to the photosensitive element.

2. The device defined in claim 1 wherein a second photosensitive element is provided with its sensitive surface facing the sensitive surface of the first photosensitive element, said second element being on the opposite side of said light source from said first element and having portions above and below said liquid surface, whereby said relative changes in surface slope cause changes in the relative light intensity upon the respective elements, and wherein said indicator means includes electrical circuit means responsive to said changes in relative light intensity.

3. The device defined in claim 2 further including light shield means positioned in relation to the light source to create a shadow line substantially coinciding with the line formed on said photosensitive elements by said surface in the absence of inclination or acceleration.

4. The device defined in claim 3 wherein said light source is positioned to direct light from beneath said surface and wherein said light shield means is positioned to create a shadow substantially superimposed upon the portions of said photosensitive elements below said surface.

5. The device defined in claim 4 wherein said light shield means comprises the bottom of said container, said bottom including a window for transmitting light, and wherein said light source comprises a lamp mounted in fixed position below said container and adjacent said window.

6. The device defined in claim 2 including two pairs of said photosensitive elements spaced apart horizontally in mutually perpendicular vertical planes, the members of each pair being connected in said indicator means to indicate inclination in said planes, respectively.

7. A device for measuring acceleration or inclination, comprising a structure including a container partially filled wtih light-transmitting liquid, a light source positioned in the structure to direct light upon the surface of the liquid from a location beneath its surface, a photosensitive means positioned with its sensitive surface partially below the surface of the liquid and partially above to receive a portion of the total emitted light, including light first incident upon said surface, and so located in relation to the light source that changes in the relative slope of the liquid surface produce related changes in the portion of light received by the photosensitive means, and indicator means connected to be responsive to the photosensitive means.

8. The device defined in claim 7 wherein said container comprises a six-sided enclosure having four vertical walls including two oppositely facing pairs of walls, said photosensitive means comprising two pairs of photosensitive elements positioned adjacent and parallel to said walls, respectively, whereby such changes in relative slope of said surface cause changes in the relative light intensity upon the members of at least one of said pairs of elements, and wherein the members of the respective pairs of elements are connected in said indicator means to indicate inclination or acceleration in mutually perpendicular directions.

References Cited

UNITED STATES PATENTS

| | | |
|---|---|---|
| 1,955,315 | 4/1934 | Styer. |
| 2,662,956 | 12/1953 | Bareford _____ 73—516 XR |
| 2,711,590 | 6/1955 | Wilcox. |
| 2,974,532 | 3/1961 | Goshen et al. _____ 73—516 |
| 3,296,870 | 1/1967 | Turnblade et al. _____ 73—504 |

JAMES J. GILL, Primary Examiner

U.S. Cl. X.R.

33—206